Figure 1:
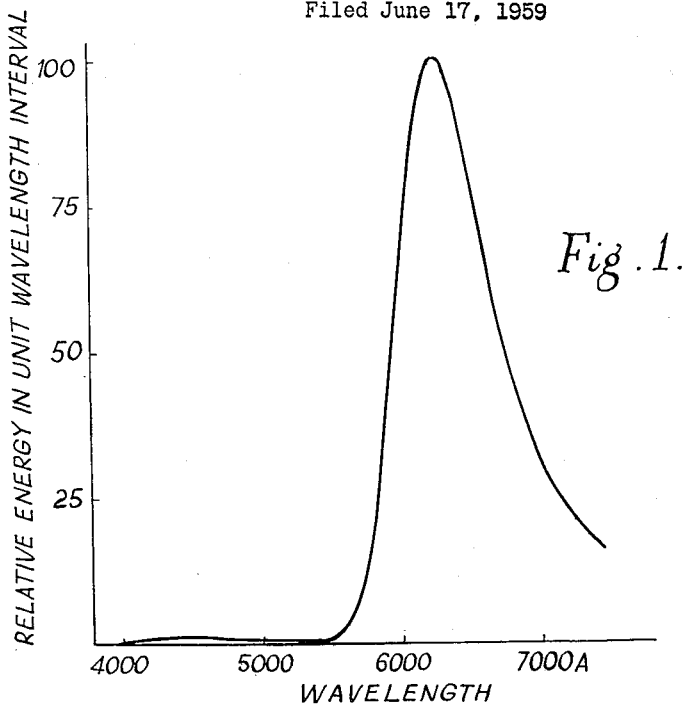

INVENTORS
PETER W. RANBY
DAVID R. PALOWKAR
BY
Lawrence Burns
ATTORNEY

3,014,877
LUMINESCENT MATERIALS

Peter Whitten Ranby and David Richard Palowkar, London, England, assignors to Thorn Electrical Industries Limited, London, England, a British company
Filed June 17, 1959, Ser. No. 820,906
3 Claims. (Cl. 252—301.4)

The present invention is concerned with luminescent materials suitable for use, for example, in fluorescent discharge lamps, on the screens of cathode ray tubes and on X-ray screens.

It is an object of the present invention to provide a method for preparing improved luminescent materials.

According to the present invention there is provided a method of preparing a luminescent material comprising a matrix of magnesium borate containing as activator cerium, or cerium and manganese, wherein a mixture of starting materials which on heating will produce the said luminescent material is heated in the presence of a halide to a temperature below the melting point of the product.

The halide should preferably be a fluoride or chloride or a mixture of fluoride and chloride.

The starting materials used in the preparation of luminescent materials according to the invention should be of high purity, as is well known in the art. The magnesium may be introduced into the initial mixture of starting materials as magnesium oxide, or a compound which will decompose thermally to form magnesium oxide and a volatile component or components, for example magnesium carbonate, or all or part of the magnesium may be introduced in the form of a halide such as magnesium fluoride. The boron may be introduced in the form of a boric acid or boric oxide. Alternatively, all or part of the magnesium and of the boron may be introduced as a precipitated magnesium borate.

The cerium may be added to the initial mixture as a compound such as the nitrate or oxide, and manganese when used, as a compound such as the chloride, carbonate or sulphate. Alternatively the cerium, and manganese when used, may be co-precipitated with the magnesium.

The halide necessary in the preparation of luminescent materials according to the invention may be introduced along with the magnesium as a magnesium halide, or, alternatively or in addition to such a procedure, it may be introduced in association with an indifferent cation, for example as ammonium chloride.

One suitable combination of starting materials is magnesium fluoride, orthoboric acid and ammonium chloride. When such a mixture is used, the molecular ratios of the starting materials may be between 1.25 and 7 moles of orthoboric acid and 0.1 and 5 moles of ammonium chloride per mole of magnesium fluoride, and preferably between 1.5 and 5 moles of orthoboric acid and 0.25 and 3 moles of ammonium chloride per mole of magnesium fluoride. The proportion of cerium should lie between 0.001 and 0.5 atom of cerium per atom of magnesium, and preferably between 0.005 and 0.35. When manganese is used, the proportion should not exceed 0.5 atom of manganese per atom of magnesium.

The preparation of luminescent materials according to the invention is carried out by heating the mixture of starting materials to a temperature of about 900° C., and, in any case, below the melting point of the product, for a time depending on the quantity of starting materials used: for example, from half an hour to four hours is a convenient period for quantities of the order of 100 grams. If the initial stage of the heating is carried out in air or an oxidising atmosphere, the final stages should be carried out in a reducing or mildly reducing atmosphere because the luminescence of the final product depends on the presence of at least part of the cerium in a lower valency state. As reducing or mildly reducing atmospheres, steam, hydrogen, or mixtures of steam and hydrogen, or of nitrogen and hydrogen are suitable.

The addition of a small amount of a lithium compound, for example lithium carbonate, during the preparation of the luminescent material, often results in a product of enhanced brightness.

The luminescent materials according to the present invention are excited by ultra-violet radiation, cathode rays and X-rays. When excited by short wavelength ultraviolet radiation they emit mainly longer wavelength ultraviolet radiation when activated by cerium alone, and deep red when activated by cerium and manganese together.

For effective use it is a necessity that the materials should be in the form of fine powders, and the fired phosphor can be ground washed, dried and sieved.

Luminescent materials according to the present invention show characteristic X-ray diffraction, details of which are given in Table I, wherein $d$ is the interplanar spacing in angstroms.

TABLE 1

| $d$ Intensity | $d$ Intensity | $d$ Intensity |
| --- | --- | --- |
| 7.65 Weak | | |
| 6.58 Medium | 2.71 Strong | |
| 6.28 Medium | | 1.749 Weak |
| 5.21 Weak | 2.59 Strong | 1.717 Weak |
| 4.73 Weak | 2.53 Medium | |
| 4.42 Strong | 2.48 Medium | 1.623 Weak |
| | 2.41 Medium | |
| 3.97 Weak | | |
| 3.80 Strong | | |
| | 2.22 Weak | 1.521 Weak |
| 3.49 Strong | 2.14 Strong | 1.467 Medium |
| 3.28 Strong | 2.11 Strong | 1.360 Medium |
| | 2.05 Strong | |
| 3.00 Strong | 2.02 Strong | 1.292 Weak |
| | 1.947 Weak | 1.242 Medium |
| 2.91 Strong | 1.884 Medium | |
| 2.83 Strong | 1.856 Medium | |

Figure 2:
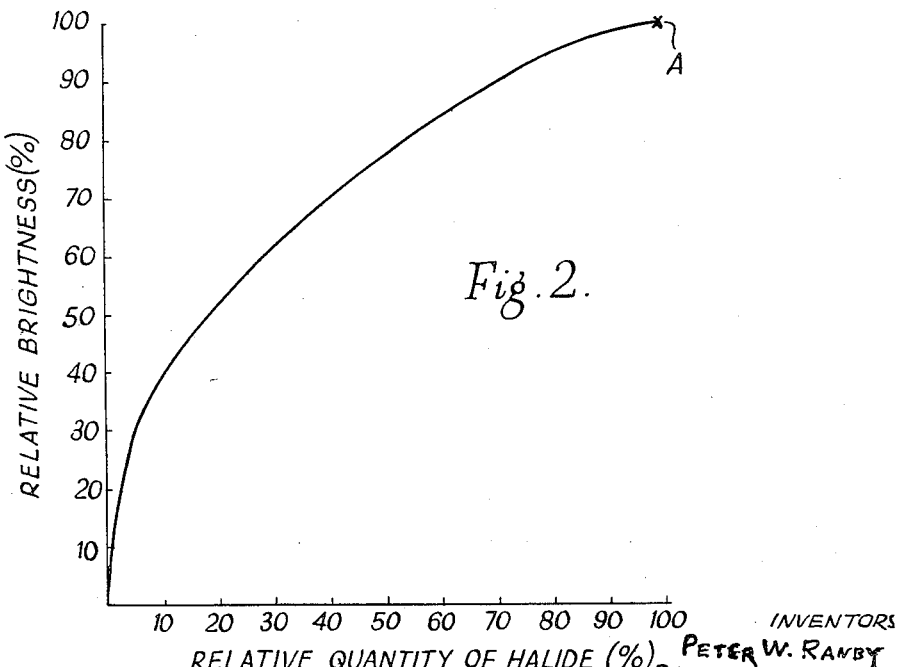

The following are examples of the preparation of luminescent materials according to the invention, and are described with reference to the accompanying drawings, in which FIG. 1 is a spectral energy distribution curve for a material prepared according to Example 4, and FIG. 2 is a curve showing the effect on luminescent brightness of variations in the quantity of halide used in the preparation of a luminescent material.

Example 1

|  | G. |
| --- | --- |
| Magnesium oxide, MgO | 26 |
| Boric acid, $H_3BO_3$ | 86.8 |
| Ammonium chloride, $NH_4Cl$ | 21.4 |
| Manganese chloride, $MnCl_2.4H_2O$ | 7.0 |
| And cerous nitrate, $Ce(NO_3)_3.6H_2O$ | 11.0 | were intimately mixed together and heated in air at 800° C. for half an hour. The fired mixture was then ground and refired in air at 900° C. for four hours. The mixture was then ground again, reheated in an atmosphere of steam at 900° C. for half an hour, and allowed to cool in an atmosphere of steam.

When cool the product showed a red luminescence when excited by radiation of wavelength 2537 A.

If this procedure is modified by omitting the ammonium chloride and replacing the manganese chloride by 4.1 g. manganese carbonate the product after firing is not appreciably fluorescent.

Example 2

The method of Example 1 was modified by the addition of 1.0 g. lithium carbonate ($Li_2CO_3$) to the mixture of starting materials. The product showed a slightly brighter luminescence than the product of Example 1 under the same conditions of excitation.

*Example 3*

The method of Example 2 was modified by reducing the amount of magnesium oxide to 18 g., adding 12.4 g. magnesium fluoride ($MgF_2$), and increasing the amount of manganese chloride to 9.0 g.

The product showed a red luminescence on excitation.

*Example 4*

The method of Example 3 was modified by replacing all the magnesium oxide and fluoride by 40.3 g. magnesium fluoride, and the last firing was carried out in an atmosphere of steam and hydrogen.

The product showed a bright red fluorescence, the spectral energy distribution of the emission being shown in FIG. 1.

If the halide is omitted from the preparation of the material according to the foregoing procedure the fired product is not appreciably fluorescent.

FIG. 2 shows the effect of variations in the halide content of materials otherwise prepared according to this example. The luminescent brightness is plotted against the quantity of halide, both brightness and quantity of halide being given in terms of the values for Example 4. The point A on the curve corresponds to the material of Example 4 itself.

*Example 5*

The method of Example 4 was modified by decreasing the quantity of magnesium fluoride to 34.1 g., increasing the quantity of boric acid to 99.0 g. and decreasing the amount of ammonium chloride to 16.05 g.

The resultant material showed a red luminescence when irradiated with short wavelength ultra-violet radiation.

*Example 6*

The method of Example 4 was modified by increasing the quantity of magnesium fluoride to 46.5 g., decreasing the quantity of boric acid to 94.4 g. and increasing the quantity of ammonium chloride to 26.75 g.

The product showed a red luminescence on excitation.

*Example 7*

The method of Example 4 was modified by omitting the manganese chloride.

The product when excited emitted mainly in the ultra-violet region of the spectrum.

*Example 8*

A precipitate was prepared from the following solutions A and B.

| | G. |
|---|---|
| Solution A.— Magnesium chloride $MgCl_2 \cdot 6H_2O$ | 1320 |
| Cerous nitrate $Ce(NO_3)_3 \cdot 6H_2O$ | 240 |
| And manganese chloride $MnCl_2 \cdot 4H_2O$ | 120 | were dissolved in 4 litres cold distilled water.

Solution B: 1000 g. ammonium carbonate was dissolved in 3.5 litres cold water and 0.5 litre ammonia solution (sp. gr. 0.880) was stirred in. To 3 litres of this solution was added 240 g. ammonium bifluoride dissolved in 1 litre distilled water.

Solution B was added slowly to solution A with continuous stirring and the resulting precipitate was filtered off but not washed. The unwashed precipitate was dried at 160° C. and ground, and was then employed in the preparation of a luminescent material.

| | G. |
|---|---|
| Ground precipitate | 100 |
| Boric acid $H_3BO_3$ | 120 |
| And lithium carbonate $Li_2CO_3$ | 1 | were intimately mixed, fired for 2 hours at 900° C., ground, and refired for 4 hours at 900° C. After being further ground, the material was fired for 30 minutes in a slow stream of steam and hydrogen at 900° C.

The product emitted a bright red fluorescence.

*Example 9*

The precipitate prepared in Example 8 was employed in the preparation of another luminescent material.

| | G. |
|---|---|
| Ground precipitate (from Example 8) | 100 |
| Boric acid $H_3BO_3$ | 90 |
| And lithium carbonate $Li_2CO_3$ | 1 | were intimately mixed and then heated for 6 hours at 900° C. The product was ground with 4% by weight of ammonium chloride and refired in a closed silica tube or crucible for 30 minutes at 950° C.

The product showed a bright red fluorescence.

We claim:

1. A method of preparing a luminescent material comprising a matrix of magnesium borate containing as activator a substance selected from the group consisting of cerium and cerium and manganese, wherein a mixture of starting materials which on heating will produce the said luminescent material is heated in the presence of a halide and, in at least the final stage of heating, in a reducing atmosphere, to a temperature of about 900° C. and below the melting point of the product, the molecular proportions of the starting materials being from 1.5 to 5 moles of orthoboric acid and from 0.25 to 3 moles of ammonium chloride per mole of magnesium fluoride, the amount of cerium used being from 0.001 to 0.5 atom of cerium per atom of magnesium and the amount of manganese, when present, not exceeding 0.5 atom per atom of magnesium.

2. A method according to claim 1 wherein the mixture of starting materials contains a ceric compound and at least the final stage of the heating is carried out in a reducing atmosphere.

3. A method according to claim 1 wherein a small amount of lithium is included in the mixture of starting materials.

References Cited in the file of this patent

FOREIGN PATENTS

| 512,154 | Great Britain | Aug. 30, 1939 |
| 447,146 | Canada | Mar. 9, 1948 |
| 165,376 | Australia | Dec. 17, 1953 |